(No Model.) 4 Sheets—Sheet 1.
G. W. BELL.
VELOCIPEDE.
No. 598,280. Patented Feb. 1, 1898.
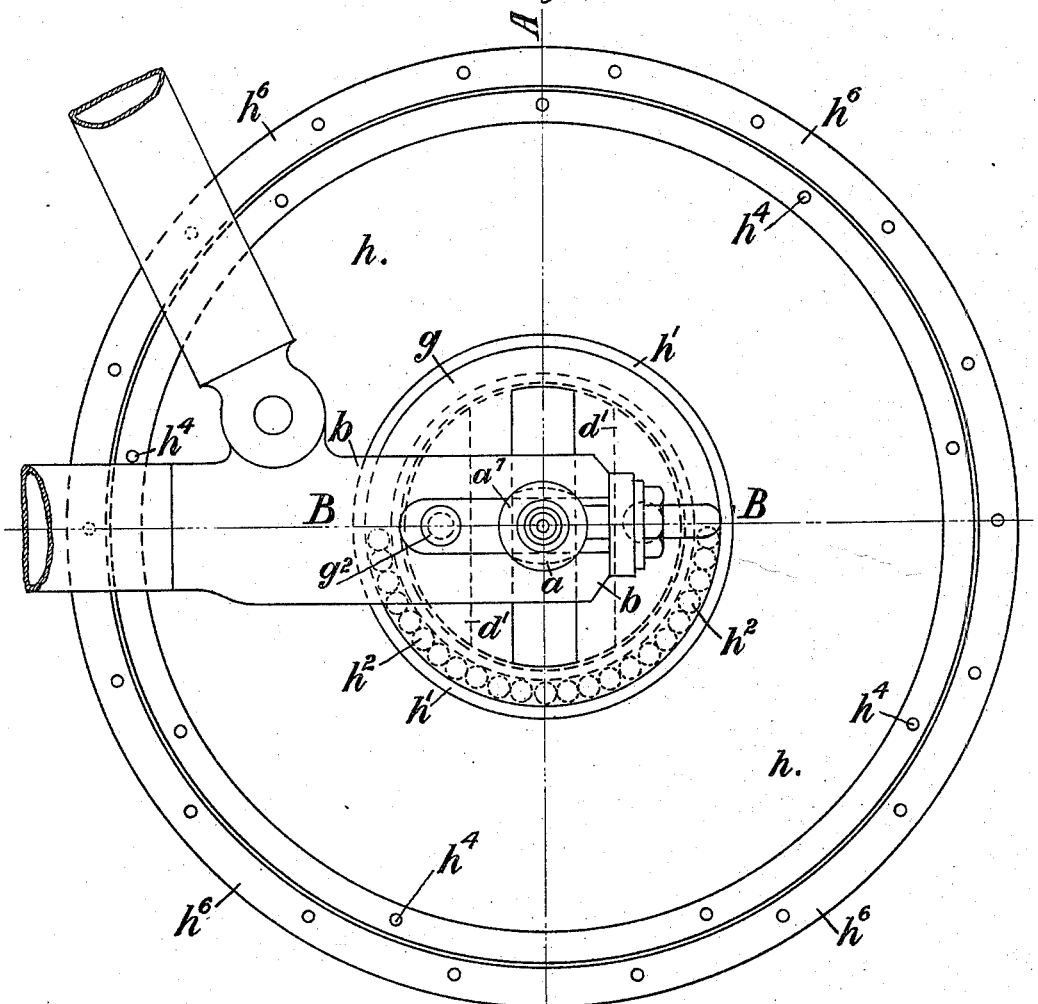
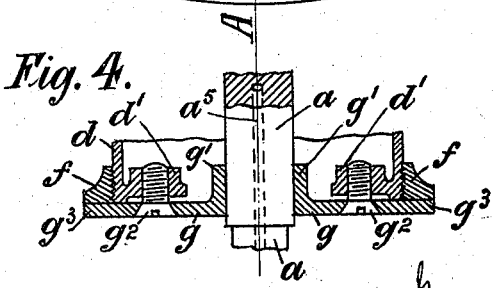
Witnesses.
Otto Munk
W. M. Hopping
Inventors.
George William Bell
by Richard
Attys
THE NORRIS PETERS CO., PHOTO-LITHO., WASHINGTON, D. C.

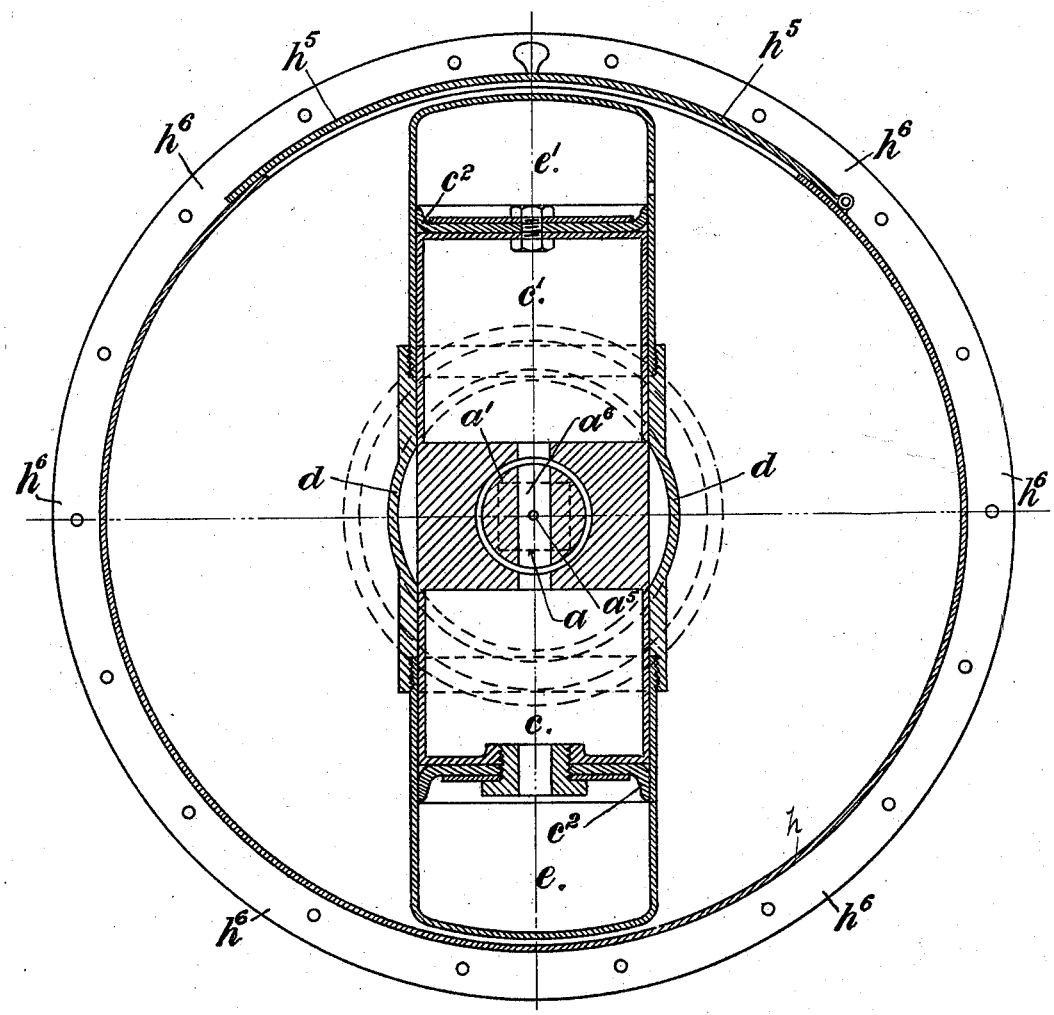

(No Model.) 4 Sheets—Sheet 3.

G. W. BELL.
VELOCIPEDE.

No. 598,280. Patented Feb. 1, 1898.

Witnesses.
Otto Munk
W. M. Hopping

Inventors.
George William Bell
by Richards
Attys.

(No Model.)

G. W. BELL.
VELOCIPEDE.

No. 598,280.

4 Sheets—Sheet 4.

Patented Feb. 1, 1898.

UNITED STATES PATENT OFFICE.

GEORGE WILLIAM BELL, OF LIVERPOOL, ENGLAND.

VELOCIPEDE.

SPECIFICATION forming part of Letters Patent No. 598,280, dated February 1, 1898.

Application filed April 17, 1897. Serial No. 632,641. (No model.)

*To all whom it may concern:*

Be it known that I, GEORGE WILLIAM BELL, engineer, a subject of the Queen of Great Britain and Ireland, residing at 97 Newsham Drive, Liverpool, in the county of Lancaster, England, have invented certain new and useful Improvements in or Connected with Velocipedes, of which the following is a specification.

This invention has principally for its object to obviate vibration in the frames of velocipedes, mainly bicycles, and to prevent the riders being jarred or shaken when traveling over rough or uneven roads and to effect these ends by a simple and light construction and parts and in a manner which, while it is efficient in practice, is unobjectionable as regards appearance.

The invention is illustrated in the accompanying drawings, which show my improvements as applied to an ordinary bicycle frame and wheels of a rear-wheel-driven machine.

Figure 3:
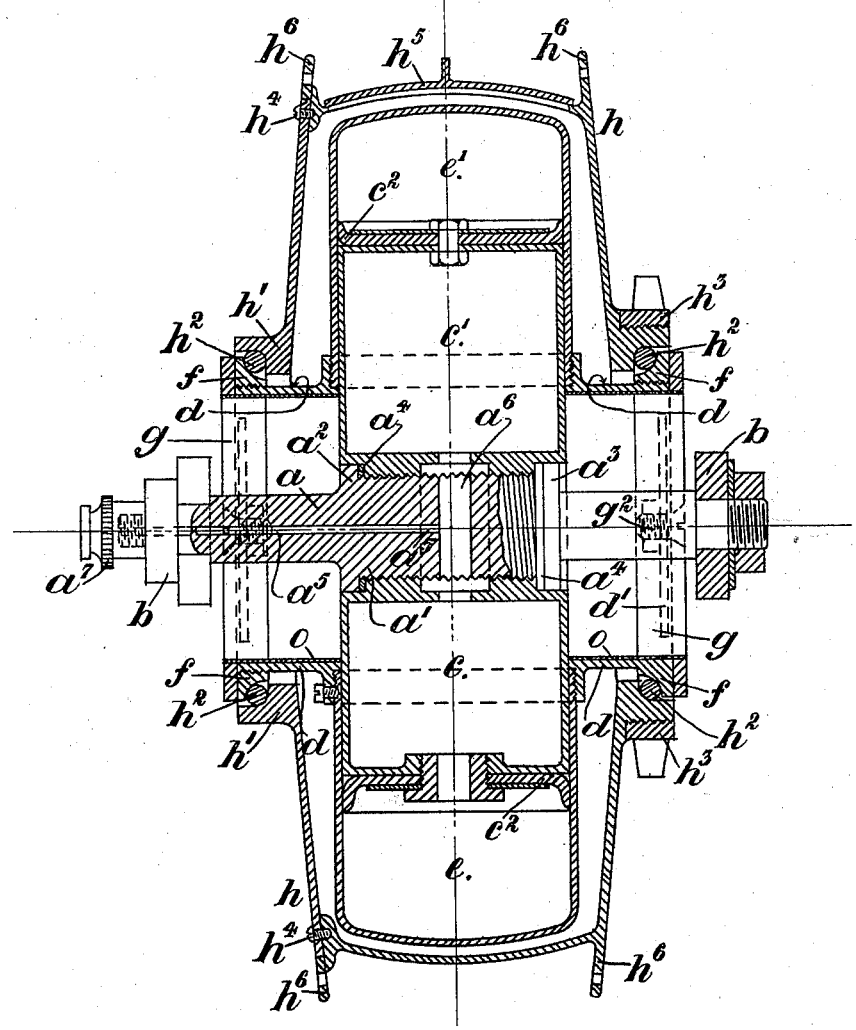
Figure 5:
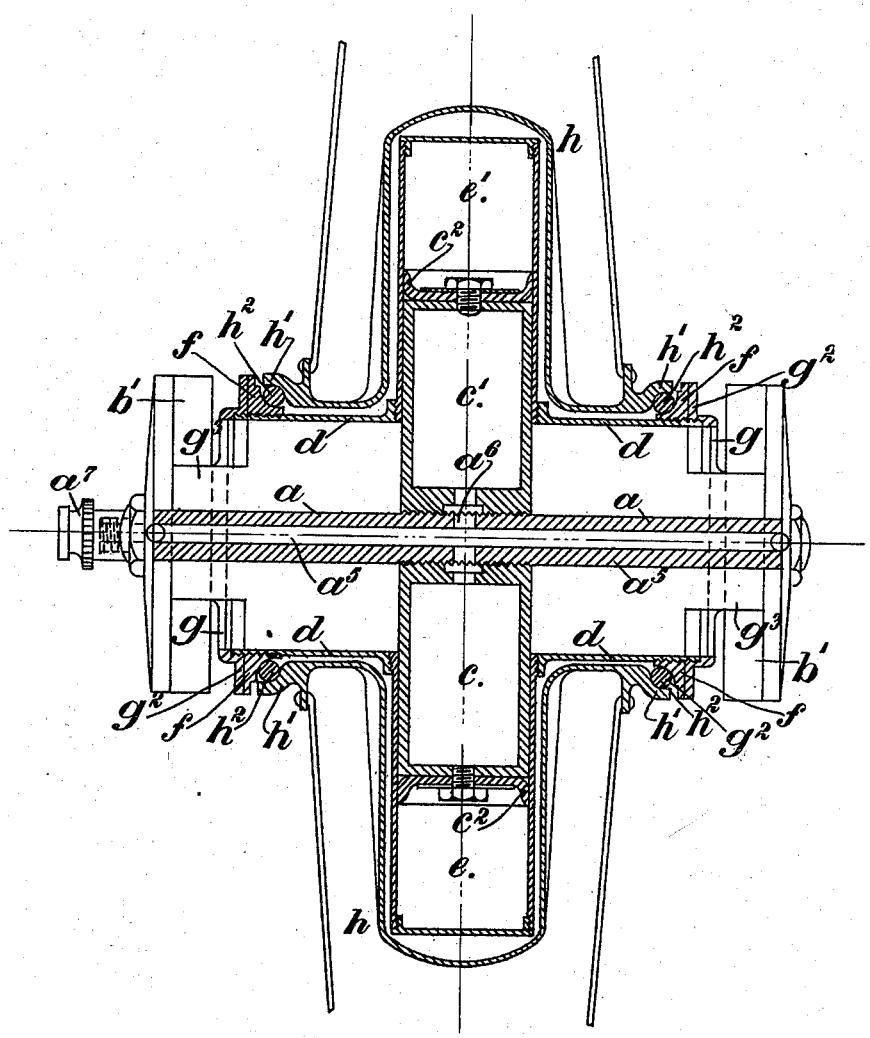

In the drawings, Figure 1 is an elevation showing the outside of the rear forks or frame and wheel-hub of a bicycle. Fig. 2 is a sectional elevation of same. Fig. 3 is a cross-section of same, taken at A A, Fig. 1; and Fig. 4 is a sectional plan of a detail, taken at B B, Fig. 1. Fig. 5 is a cross-section showing a modification of this invention.

In a bicycle according to this invention the frame is supported at the wheel-axles pneumatically—that is to say, between the wheels and the frame there is an air vessel, and upon the air in the vessel or vessels the frame and the weight of the rider are supported. In previous designs or methods adapted to effect this end the main difficulty met with has been the side cant or tendency of side cant of the wheel—that is, the tendency of the wheels to move out of the true plane of the frame of the machine in which they normally lie. In these methods or means as designed and constructed this tendency of side cant of the wheel has been such that the strain and friction put upon the parts connected with the pneumatic supporting cylinders or chambers has rendered it extremely difficult, if not impossible, to attain the desired ends in a practical way—*i. e.*, without making the parts extremely strong and heavy or introducing some inadmissible or impracticable features. According to this invention these defects and difficulties are overcome, and this is obtained by the construction and arrangement hereinafter described.

Under this invention the pneumatic devices—namely, the cylinders and pistons which contain and act upon the air—are disposed within the vertical plane of the wheel, so that the weight and pressure applied to the pneumatic devices and the frame is transmitted and acts at a point in the plane of the wheels. By this means the cylinders and pistons employed are not subjected to strains, or subjected only to comparatively small strains, due to the canting tendency or action of the wheel.

Referring now to the drawings, a spindle $a$ is rigidly fastened in the ends of the two frame-forks $b$ and carries at its center the pistons or plungers $c$ $c'$, one below and one above the spindle, while outside and around it there is a hollow nave or sleeve $d$, which carries on its upper and under sides the cylinders $e$ $e'$, in which the pistons or plungers $c$ $c'$ fit and work. At the outer edges of the nave $d$ are ball-races or collars $f$, which screw onto the ends of $d$, forming the fixed portions of the ball-bearings of the wheel. On the ends of the nave $d$ there are guide-plates $g$, having angle guide-bars $g'$, forming guides, between which is a slideway or slot which is arranged parallel with the axis of the pistons and cylinders. In this slideway or slot the spindle $a$ moves up and down, and by the guides $g'$ the nave and the wheel is prevented from moving about its vertical axis—that is, the wheel is prevented from moving out of the plane of the frame of the machine. The guide-plates $g$ are secured in position by screws $g^2$ and plates $d'$ on the inside of $d$, being placed at a small distance inside the edges of $d$. The guides $g$ extend beyond the edges of $d$ at $g^3$, and they are screwed up to bear on the collars $f$ by the screws $g^2$, and so serve to lock these collars in position on the nave $d$. $o$ are rubber strips on the top and bottom of the nave, acting as cushions to the spindle $a$.

The wheel-hub is designated $h$ and in the construction shown in Figs. 1 to 3 forms a case inclosing the cylinders and hollow nave. The ball-races $h'$ of the hub come peripherally outside and axially inside the bearing-collars $f$ and the balls $h^2$. At one side, on the outside of one of the hub parts $h'$, the driving sprocket-wheel $h^3$ is fixed. The hub shown is made in two parts, the right-hand side, Fig. 3, consisting of a side plate and a peripheral plate or cylinder, while the other part consists of a side plate only, the latter being connected to the former at $h^4$ by screw connections. A door $h^5$ on the periphery of the hub is provided for gaining access to the interior thereof. The spokes of the wheel are connected to the flanges $h^6$ of the hub in the usual way.

With regard to the details of construction and arrangement of the spindle $a$ and the pistons or plungers $c$ $c'$ the two pistons are in one piece, with a centrally-threaded hole into which the enlarged and externally-threaded part $a'$ of the spindle $a$ is screwed, the part $a'$ of the spindle having a collar $a^2$ at one end and a nut $a^3$ at the other, with internal washers or packing-pieces $a^4$ for making air-tight joints between the spindle and the pistons. The spindle $a$ has an axial hole $a^5$ and a radial hole $a^6$ in it, by which air is forced into the pistons and so to the cylinders $e$, a suitable valve $a^7$ being provided on the end through which the air is forced and by which it is retained.

The parts of the spindle $a$ which move up and down in the guides $g$ are flat-sided or rectangular and act as slides in connection with the guides. The piston or plunger heads are provided with packing $c^2$, that shown being cup-packing, of leather or other suitable material, suitably held down in place. Free communication exists between the interior of the piston $c$ and the cylinder $e$ by a perforation in the head thereof. In the case shown in Figs. 1 to 3 the cylinders $e$ $e'$ are separate pieces from the nave and are screwed into internally-threaded necks thereon. The piston $c'$ and cylinder $e'$, being or serving as a supporting slide and guide to the wheel, also serve to act as a dash-pot or cushion to cushion the action and limit it when the pistons rise in their cylinders, air being admitted to and from them in any known way.

The action and effect of the mechanism and construction described is as follows: When air is forced into and compressed in the cylinder $e$ and pistons, (which act as reservoirs for compressed air and provide a storage-space for a considerable volume,) the pistons would be forced normally upward, so that the spindle $a$ will lie in the upper part of the stationary nave $d$, and the pressure of air used being such that its reaction upon the area of the ram $c$ will support or balance the proportion of the weight of the rider and that of the machine which comes upon it. Then when the bicycle is running over an uneven road and its wheels meet a sudden rise, as the sudden rise of a hole or depression into which it has descended or a projecting obstacle on the road, the lifting of the load, which has to be raised instead of having to be wholly suddenly lifted, is distributed over a considerable period of time, as the rise of the wheel first compresses the air in the air-cylinder, and the compressed air, acting upon the piston $c$, raises the bicycle frame and rider, so that the upward movement of the wheel is transmitted to the frame and rider through the compressed air. In this action the nave $d$ is moved up with the wheel over the spindle $a$, being guided in the movements by the guides $g'$. The effect is that the frame and rider normally rest on the compressed air in the cylinder $e$, and when the wheels and bicycle pass over an abrupt rise, as described, the rider and frame do not receive a sudden movement or jar, but are lifted gradually and easily over by the compressed air. In addition to this function the pistons or plungers $c$ $c'$, being rigidly connected to the frame of the bicycle through the spindle $a$, act as supports to the wheel through the cylinder $e$ $e'$ as regards its retention in the vertical plane of the bicycle.

The effect of the arrangement and construction set forth—viz., disposition of the support and guide within the wheel and in the plane thereof—is that the normal tendency of movement of the wheel up and down on the pistons is directly in a plane in which the axis of the cylinders and pistons themselves lie and work, and thus normally the action of the pistons and cylinders does not tend to cant the wheel out of its normal position in relation to the axle—that is, at right angles to it—but if any abnormal pressure tends to cant the wheel then the central arrangement and the single set of cylinders and pistons, disposed and working in the same plane as that of the wheel itself, are in the most favorable position in relation to the wheel to keep in the vertical plane of the machine—namely, the pistons and cylinders constituting practically a single slide supported at two ends they provide an arrangement which affords the greatest rigidity with the least friction.

In cases where a greater piston area than can be conveniently provided by a single compression is required there may be used, in addition to the cylinders and pistons shown, other compression-cylinders on each side of same, having their axes parallel therewith and in the plane of the wheel. The pistons of these cylinders would be connected with the central piston, and the cylinders would be connected with the nave $d$; but these pistons need not necessarily be rigidly connected up with the main pistons, as they need not serve as guides and slides to keep the wheels from canting out of their vertical position, but only to provide additional piston area on which the air acts.

In the modification shown in Fig. 5 the casing of the hub of the wheel in which the cylinders are disposed lies within the spokes, as shown, which are attached to flanges $h^6$ on the barrel of the hub. In this case also the frame of the bicycle at the fork ends is provided with vertical guide-plates $b'$, to which the spindle $a$ is fastened, while the guide-plates $g$ are provided with slides $g^3$ on each side of the spindle $a$, which slide on the inside of the vertical guides $b'$, and so prevent the wheel moving about its vertical axis or in any other than the directions required.

In the case of a bicycle provided with my improvements preferably both the rear and front wheels would be constructed as set forth, so that both the front and rear portions of the frame would be carried upon elastic media and the weight would be distributed between the elastic media in the two wheels.

The converse arrangement of cylinders and pistons to that shown in Figs. 1 to 3 may be employed in some cases, in which case the plungers or pistons would be supported from the nave $d$, while the cylinders would be carried by the spindle $a$ and compressed air will be held in the upper cylinder. Also, as a modification hereunder, in lieu of using compressed air as the elastic medium on which the weight of the bicycle and rider are carried helical or like springs may be used, in which case the cylinders and pistons or their equivalents, which serve as the guides and slides, keep the wheel from canting and in in its required position and also as the two parts between which the springs would be introduced and act.

As a modification of parts of the construction shown in the drawings, in lieu of the spindle $a$, serving as the conduit for the supply of air, a separate valve may be provided on the lower cylinder or lower and upper cylinders, through which air is introduced, and as a means of lubricating the pistons and cylinders the lubricant may be carried in the bottom of cylinder $e$, into which the end of the piston $c$ dips and so lubricates itself, while the upper piston may carry the lubricant on its cup-leather. Then, as to the arrangement of the upper cylinder, this in some cases may also serve as a support in addition to that of the bottom cylinder by connecting the piston to the spindle by a rod which would pass through a cover on the end of the cylinder next the spindle, between which end and the piston compressed air would be contained, while the back end of the piston and cylinder will serve as the dashpot or cushion, as above described. Further, as a modification as regards the retention of air, in some cases this may be inclosed in elastic or compressible air-tight rubber or other bags placed within the cylinders.

In all cases the guides which guide the spindles $a$ should be at right angles to the chain-line of the bicycle in order that the proper action up and down about the fixed or driving sprocket-wheel takes place. The hub in some cases, instead of being a solid plate, as shown, at each side, may have openings in it.

In some cases, in which the capacity of the air-reservoirs described are not sufficient, they may be connected up with one or more of the tubes of the frame, so as to render said tube part of the reserve-air reservoir.

What is claimed in respect of the herein-described invention is—

1. In a velocipede-wheel having a hollow hub, a hollow nave within said hub on which the wheel revolves, a cylinder on the nave disposed within and in the vertical plane of the wheel, a spindle passing through the hollow nave and secured to the velocipede-frame, a piston carried by the spindle and working in the cylinder, and an elastic medium interposed in the cylinder between the nave and spindle, substantially as described.

2. In a velocipede-wheel having a hollow hub, a hollow nave within said hub on which the wheel revolves, cylinders on said nave disposed within and in the vertical plane of the wheel, a spindle $a$ passing through the hollow nave and rigidly connected with the velocipede-frame, and carrying pistons fitting and working in said cylinders, said cylinders being charged with air on which the pistons connected with the spindle work and rest; substantially as set forth.

3. In a velocipede, a hollow hub $h$, a hollow nave $d$ within said hub having on the upper and under sides cylinders $e\ e'$, a spindle $a$ rigidly connected with the frame $b$ of the cycle, pistons $c\ c'$ on said spindle working in the cylinders $e\ e'$; combined and operating substantially as set forth.

4. In a velocipede-wheel having a hollow hub, a hollow nave $d$, a spindle $a$, said spindle and nave having parts working upon one another, and serving as guides and slides within the wheel, and guides $g$ in connection with which the ends of the spindle $a$ work; substantially as and for the purposes set forth.

5. The combination of the hollow spindle $a$ having an air-passage therein and an air-valve thereon, the pistons $c$ and $c'$ communicating with the air-passage of the spindle, the cylinder $e$ being in communication with the interior of the piston $c\ c'$; substantially as set forth.

6. In a bicycle having a hollow wheel and nave, the guide-plates $g$ with flanges $g^2$ fastened in the nave, in combination with the bearing-collars $f$ by which said flanges are locked in position.

7. In a velocipede-wheel having a hollow hub, and a hollow nave within said hub, on which the wheel revolves, the cylinders $e\ e'$ screwed into said nave, and in which pistons work, and a door $h^5$ in the periphery of the hub by which access can be had to the interior of the hub and the cylinders unscrewed, and access had to the pistons; substantially as set forth.

In testimony whereof I have hereunto set my hand in presence of two subscribing witnesses.

GEORGE WILLIAM BELL.

Witnesses:
ERNEST R. ROYSTON,
JOHN H. WALKER.